(12) United States Patent
Gattass et al.

(10) Patent No.: US 10,359,574 B2
(45) Date of Patent: Jul. 23, 2019

(54) INFRARED TRANSMITTING EPOXYLESS FIBER OPTIC CONNECTOR AND FIBER OPTIC CABLE

(71) Applicant: The United States of America, as represented by the Secretary of the Navy, Washington, DC (US)

(72) Inventors: Rafael R. Gattass, Washington, DC (US); Leslie Brandon Shaw, Woodbridge, VA (US); Jasbinder S. Sanghera, Ashburn, VA (US); Shyam S. Bayya, Ashburn, VA (US); Daniel L. Rhonehouse, Chesapeake Beach, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 77 days.

(21) Appl. No.: 16/000,579

(22) Filed: Jun. 5, 2018

(65) Prior Publication Data

US 2018/0356599 A1      Dec. 13, 2018

Related U.S. Application Data

(60) Provisional application No. 62/516,854, filed on Jun. 8, 2017.

(51) Int. Cl.
| | |
|---|---|
| *G02B 6/38* | (2006.01) |
| *G02B 6/44* | (2006.01) |
| *G02B 6/028* | (2006.01) |
| *G02B 6/10* | (2006.01) |

(52) U.S. Cl.
CPC ......... *G02B 6/3813* (2013.01); *G02B 6/0288* (2013.01); *G02B 6/3847* (2013.01); *G02B 6/3855* (2013.01); *G02B 6/4477* (2013.01); *G02B 6/102* (2013.01)

(58) Field of Classification Search
CPC .. G02B 6/3813; G02B 6/3855; G02B 6/3847; G02B 6/0288; G02B 6/4477; G02B 6/102
See application file for complete search history.

(56) References Cited

U.S. PATENT DOCUMENTS

| | | | | |
|---|---|---|---|---|
| 3,241,986 | A * | 3/1966 | Jerger, Jr. | C03C 3/321 501/37 |
| 7,292,323 | B2 * | 11/2007 | Artsyukhovich | A61F 9/007 356/73.1 |
| 7,382,949 | B2 * | 6/2008 | Bouma | A61B 1/00183 385/25 |

(Continued)

*Primary Examiner* — Andrew Jordan
(74) *Attorney, Agent, or Firm* — US Naval Research Laboratory; William P. Ladd (57) ABSTRACT

Systems and methods are provided for mechanically encapsulating an infrared transmitting optical fiber, removing any power coupled to the cladding of the infrared optical fiber, and bridging the thermal properties between the optical fiber and the mechanical ferrule used. Embodiments of the present disclosure have several advantages over prior systems. For example, in an embodiment, the transmitting ferrule does not require epoxy to mount the fiber to the ferrule, isolates the front face of the fiber, and allows for high power to be incident on the connector without damage by reducing the thermal induced stress and managing any stray light coupled to the core.

20 Claims, 11 Drawing Sheets

(56) References Cited

U.S. PATENT DOCUMENTS

2006/0103835 A1* 5/2006 Artsyukhovich ....... A61F 9/007
356/73.1
2018/0356599 A1* 12/2018 Gattass ................ G02B 6/3813

* cited by examiner

Polished ferrule: full contact

INFRARED TRANSMITTING EPOXYLESS FIBER OPTIC CONNECTOR AND FIBER OPTIC CABLE

CROSS REFERENCE TO RELATED APPLICATIONS

This application claims the benefit of U.S. Provisional Patent Application No. 62/516,854, filed on Jun. 8, 2017, which is incorporated by reference herein in its entirety.

FIELD OF THE DISCLOSURE

This disclosure relates to optical systems, including fiber optic cables.

BACKGROUND

Current methods for infrared fiber encapsulation into a fiber optic ferrule involve filling the fiber optic ferrule with epoxy. In conventional techniques, the fiber is mechanically held in place by the epoxy, the fiber and epoxy have poor thermal conduction, and the fiber epoxy is not transparent in the infrared (IR) wavelength range wherein the fiber operates. As a result, any stray light not coupled to the fiber or misalignment of the input fiber optic coupling system can result in catastrophic failure of the fiber cable.

In conventional systems, IR fibers are mounted with the same epoxy as silica fibers. IR fibers have greater than 25 times the coefficient of thermal expansion (CTE) of silica (silica: 0.75 ppm/° C., Fluoride: 19 ppm/° C., Chalcogenide: 21 ppm/° C.).

In high power laser systems, distinct material properties of laser system components and the exposure to heat of these components can lead to multiple failure mechanisms not addressed by current techniques. For example, in conventional systems, a specialty fiber cannot be directly clamped. Further, in conventional systems, poorly coupled IR light heats the ferrule, leading to a pistoning effect and stress failure (e.g., radial expansion). Additionally, in conventional systems, clad-guided light heats up the polymer. Light not being tightly coupled to the fiber core can cause some stray light to leak to the fiber cladding and be absorbed by the fiber coating.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods that mitigate failure mechanisms in high power laser systems. For example, embodiments of the present disclosure provide systems and methods for simultaneously mechanically encapsulating an infrared transmitting optical fiber, removing any power coupled to the cladding of the infrared optical fiber, and bridging the thermal properties between the optical fiber and the mechanical ferrule used.

In an embodiment, the infrared transmitting fiber optic ferrule does not require the use of an epoxy to mount the fiber to the ferrule, isolates the front face of the fiber, and allows for high power to be incident on the connector without damage by reducing the thermal induced stress and managing any stray light not coupled to the core.

Embodiments of the present disclosure have several advantages over prior systems. For example, in an embodiment, the transmitting ferrule does not require epoxy to mount the fiber to the ferrule, isolates the front face of the fiber, and allows for high power to be incident on the connector without damage by reducing the thermal induced stress and managing any stray light coupled to the core.

2. Optical Fibers

Multiple bands are present in the optical spectrum, with the ranges being roughly defined to certain wavelength ranges. The ultraviolet optical band (UV) is roughly defined as spanning optical wavelengths from 0.2-0.4 µm. The visible optical band (VIS) is roughly defined as spanning optical wavelengths from 0.4-0.8 µm. The shortwave infrared optical band (SWIR) is roughly defined as spanning optical wavelengths from 0.8-2 µm. The mid-infrared optical window (MWIR) is roughly defined as covering optical wavelengths from 2-5 µm. The long-wave infrared optical band (LWIR) is roughly defined as covering optical wavelengths 5-30 µm. Infrared fibers are fibers capable of transmitting light in the MWIR optical window or LWIR optical window. Infrared fibers can be composed of chalcogenide glasses, fluoride glasses, telluride glasses, and germinate glasses. Thermal characteristics for these fibers are presented in Table 1 below:

TABLE 1

Coefficients of Thermal Expansion
for Optical Glasses used in Fibers

| Glasses | Coefficient of Thermal Expansion (µm/m-° C.) |
| --- | --- |
| Silica | 0.75 |
| Germanate | 10.9 |
| Tellurite | 18.5 |
| Fluoride (ZBLAN) | 18.7 |
| Fluroide (InF) | 19.2 |
| Chalcogenide | 20.2 |

A chalcogenide optical fiber is fiber can be comprised primarily of chalcogenide glass which contains at least one of the chalcogen elements (excluding oxygen, i.e. sulfur, selenium, and tellurium) along with other elements to form a glass network. Typically, these other elements can include arsenic, germanium, gallium, indium, antimony, tin, bismuth, lead, thallium, lanthanum, and aluminum, but other elements may also be used. Halogen elements including fluorine, chlorine, bromine, and iodine may be added to make chalco-halide glass and fibers. Arsenic sulfide, $As_2S_3$ and Arsenic Selenide $As_2Se_3$, Germanium Arsenic Sulfide, and Germanium Arsenic Selenide are some specific examples of chalcogenide glass.

Optical fibers used in accordance with embodiments of the present disclosure include step index, grated index, single mode, and multimode fibers. Other applicable fibers include photonic crystal fibers (PCF), photonic bandgap (PBG) fibers, inhibited coupling (also called frustrated or anti-resonant) fibers, multicore fibers and many others.

Ferrule materials can be ceramic, metallic (typically stainless steel, titanium, copper), or plastic. Ferrule materials used in accordance with embodiments of the present disclosure can be opaque or absorbing at MWIR and LWIR wavelengths. Thermal characteristics for ferrule materials are listed in Table 2.

TABLE 2

Coefficients of Thermal Expansion for Materials
Commonly Used in Fiber Optic Ferrules

| Ferrules | Coefficient of Thermal Expansion (µm/m-° C.) |
| --- | --- |
| Titanium | 9.2 |
| Ceramic $ZrO_2$ | 10.3 |
| Stainless Steel (304) | 17.3 |
| Brass | 18.7 |
| Silver | 19.5 |

Figure 1A:
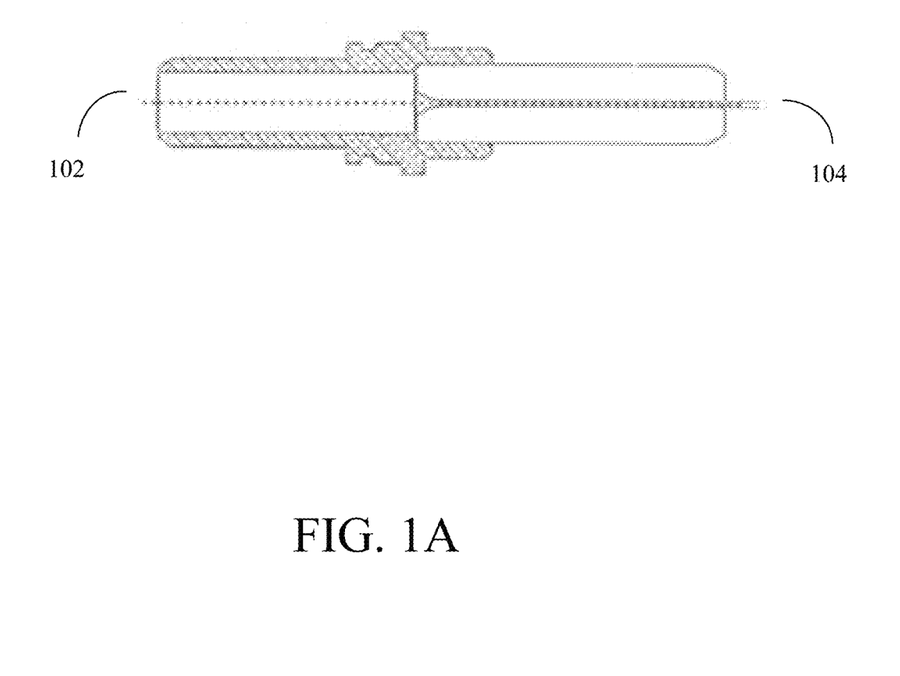
FIG. 1A shows a cross-section of an exemplary fiber optic ferrule in accordance with an embodiment of the present disclosure.
Figure 1B:
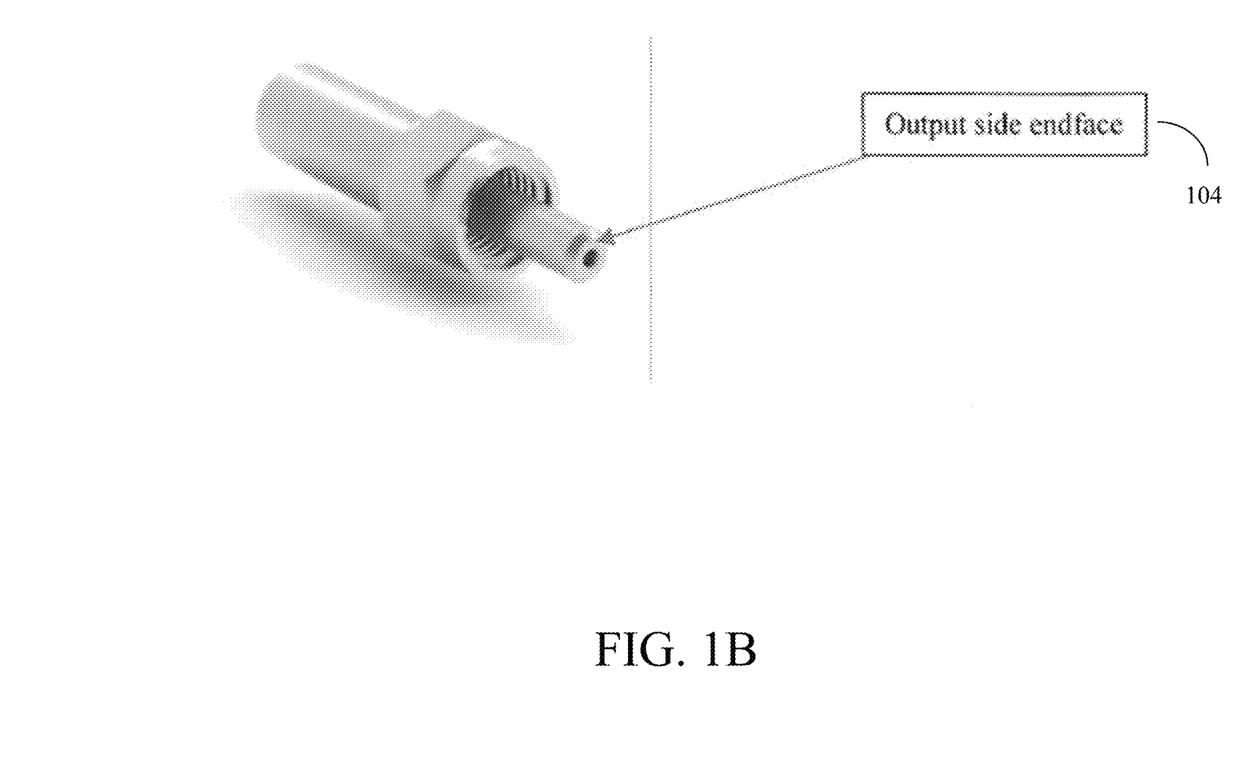
FIG. 1B shows an image of a fiber optical ferrule in accordance with an embodiment of the present disclosure.

FIG. 1A shows a cross-section of an exemplary fiber optic ferrule in accordance with an embodiment of the present disclosure. In FIG. 1A, a fiber can be threaded through input side 102. In FIG. 1A, output side 104 shows the end of the ferrule. FIG. 1B shows an image of a fiber optical ferrule in accordance with an embodiment of the present disclosure. FIG. 1B shows output side 104 having an endface.

High power lasers can be continuous wave lasers or pulsed lasers. For continuous wave lasers, average powers range from 1 W to 100 kW (usually from 10 to 100 W). For pulsed lasers, peak powers range from 1 W to 100 GW (usually from 10 W to 10 kW).

Softening temperature can be understood as the temperature under which the viscosity of the material is $10^{7.6}$ poise (a unit of viscosity). In an embodiment, this temperature point can be dependent on the material compositions being on the order of 1665° C. for silica, 820° C. for borosilicate glasses, and about 600° C. for gennanate glasses. Chalcogenide, fluoride, and telluride based glasses have softening temperatures in the range of 160 to 600° C. The glass transition temperature can be understood as the temperature under which the viscosity of the material is $10^{13.6}$ poise.

3. Use of Optical Fibers in Devices

Practical use of optical fibers in devices and field applications usually requires mounting of optical fibers into a mechanically robust package which can be connected to a device or secured in position. These fiber packages are commonly called fiber connectors. For example, a fiber can be encapsulated in a ferrule and secured in place in the ferrule. A common method for securing the fiber in the ferrule is to use an epoxy to connect the optical fiber (typically made of silica glass) to the ferrule (typically made of stainless steel or a ceramic). This method of securing a fiber is well suited for low optical power applications where the fiber, ferrule, or epoxy are never exposed to sufficient power to lead to a large temperature rise (e.g., a temperature at which the epoxy can flow, such as about 100° C.).

Typically, the alignment light into an optical fiber needs to be kept constant down to 100 µm, more preferably down to 1 µm. For connections between optical fibers such as mechanical splices, the positioning of the optical fiber needs to be kept constant to 100 µm, more preferably down to 1 µm, but with the additional constraint that the fiber must not move along its optical axis (pistoning effect), as this could lead to the two fibers crashing into each other.

Mechanically securing an optical fiber in place for devices, operations or interconnections at MWIR and LWIR wavelengths can present a series of unexpected challenges when compared to devices, operations, or interconnections at visible and SWIR wavelengths. For example, silica fiber is not a good candidate for use in this wavelength range as it displays enormous absorption for wavelengths beyond 2.4 µm. Common material systems used for making infrared transmitting optical fibers include gennanates, tellurite, fluoride, and chalcogenide based glasses. These material systems have significantly different thermal, optical, and mechanical properties than silica, giving rise to a series of issues to be addressed when encapsulating the fiber.

For example, the refractive index of most of infrared fibers (excluding fluorides-based fibers) is above 1.7, while the polymers used as protective coatings in optical fibers have refractive indices on the order of 1.5. As a result, any stray light not well coupled into the core of the fiber is confined to the cladding of the optical fiber. At the fiber's output end, this results in a distorted/contaminated/incorrect output optical mode, which represents severe degradation of the performance of the optical system and can even result in failure if the clad-guided power carried is projected to a sensitive part of the system. In silica based optical fibers, the polymer has a higher index than the cladding and can remove any light that propagates in the cladding. For example, in a typical silica based optical fiber (e.g., Corning SMF28), the refractive index of the core, cladding and coating layer 1.4604, 1.4447, and 1.4782, respectively. The light can be scattered into the polymer and then scattered out to free space, or it can be absorbed by the polymer. The removal of the optical power propagating in the cladding can be referred to as cladding mode stripping.

Infrared optical glasses used in fibers have a relatively low softening point. While the softening point for silica is above 1600° C., infrared glasses have softening points on the order of 150 to 600° C. Additionally, the coefficient of thermal expansion for infrared glasses is on the range of 10 to 30 ppm/° C., being 20 to 60 times larger than that of silica (0.5 ppm/° C.). The lower softening point coupled with the larger thermal expansion coefficient makes thermal management of any possibly induced heat crucial for stable operation.

Many compositions of infrared glasses, such as those made of chalcogen elements, display enhanced volatization if ground to a powder and heated up to temperatures above the glass transition temperature. Volatization leads to chemical composition changes and formation of striations in the material. For this reason, fusing powder of these infrared glasses is not a viable approach for forming a continuous layer inside a ferrule.

In high power laser systems, distinct material properties of laser system components and the exposure to heat of these components can lead to failure mechanisms not addressed by current techniques. Fiber connectors should robustly locate the position of a fiber in the system. For example, when coupling from a free-space laser into a fiber, the front face of the fiber at the end of the ferrule is exposed to high intensities (power per unit area) as the laser is focused onto that surface. The efficiency with which power is coupled into the core of the optical fiber is determined by the optical system focusing the laser and the precise positioning of the fiber. Failure can occur if the beam is not incident on the fiber and is absorbed by the epoxy. Failure can occur if too much power density is coupled to the cladding, as the power density at the polymer coating (or epoxy interface) can lead to heat buildup and degradation of the polymer, epoxy or fiber. Thermal expansion of the fiber within the ferrule can lead to misalignment of the beam, stress buildup at the fiber tip and, in the case of fiber-to-fiber connections, misalignment. All of these thermal expansion induced effects can be sources of damage.

At wavelengths beyond those transmissive by silica, such as MWIR and LWIR, the absorption by the epoxy and metal can increase significantly with respect to the absorption at visible and SWIR wavelengths, to the point of melting the epoxy, or ablating the metal or epoxy. The flowing epoxy as well as the metal splatter (from ablation) can coat the fiber end face, leading to damage.

Figure 2A:
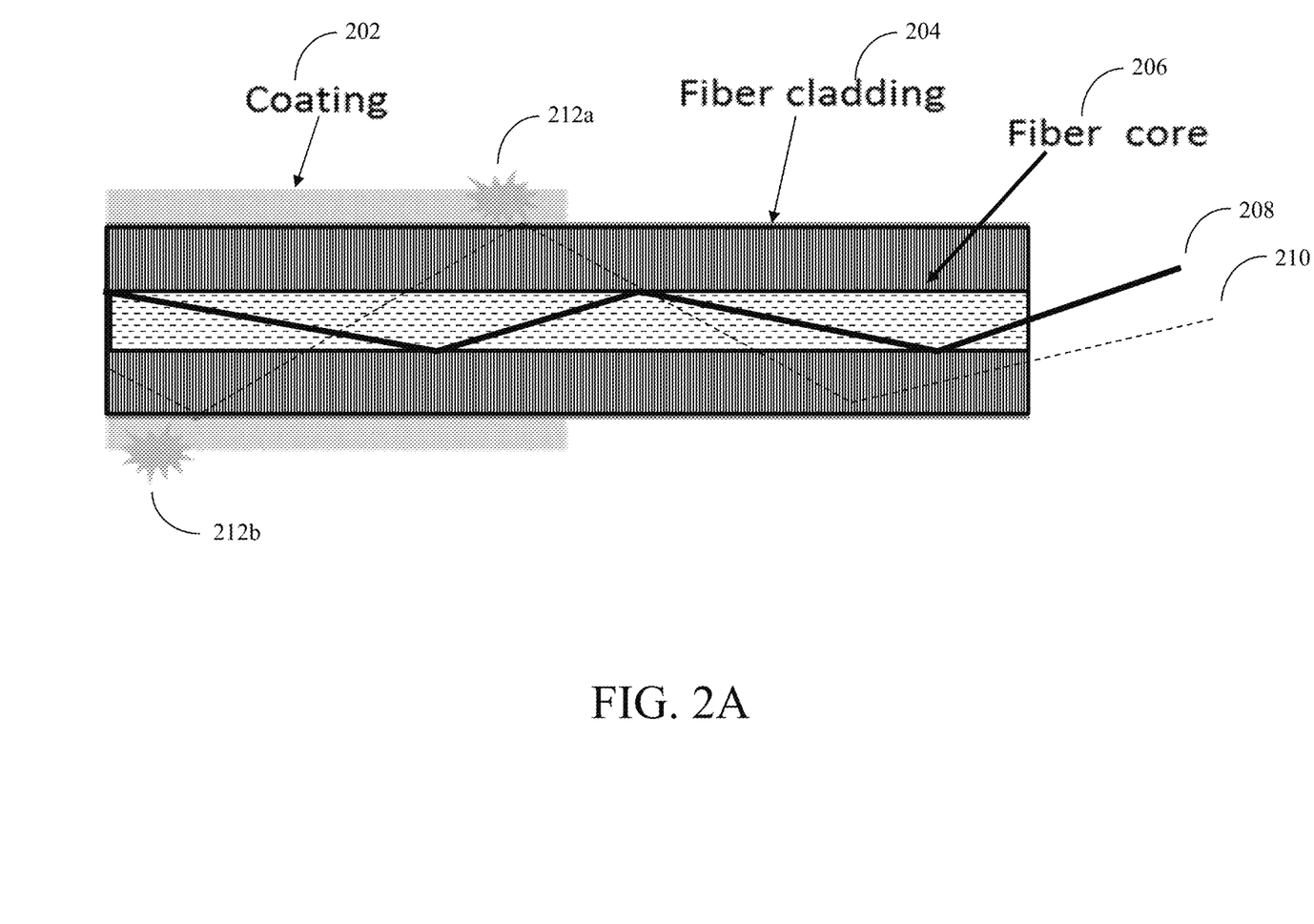
FIG. 2A shows a diagram illustrating failure points caused by light not coupled to the core of the fiber in accordance with an embodiment of the present disclosure.
Figure 2B:
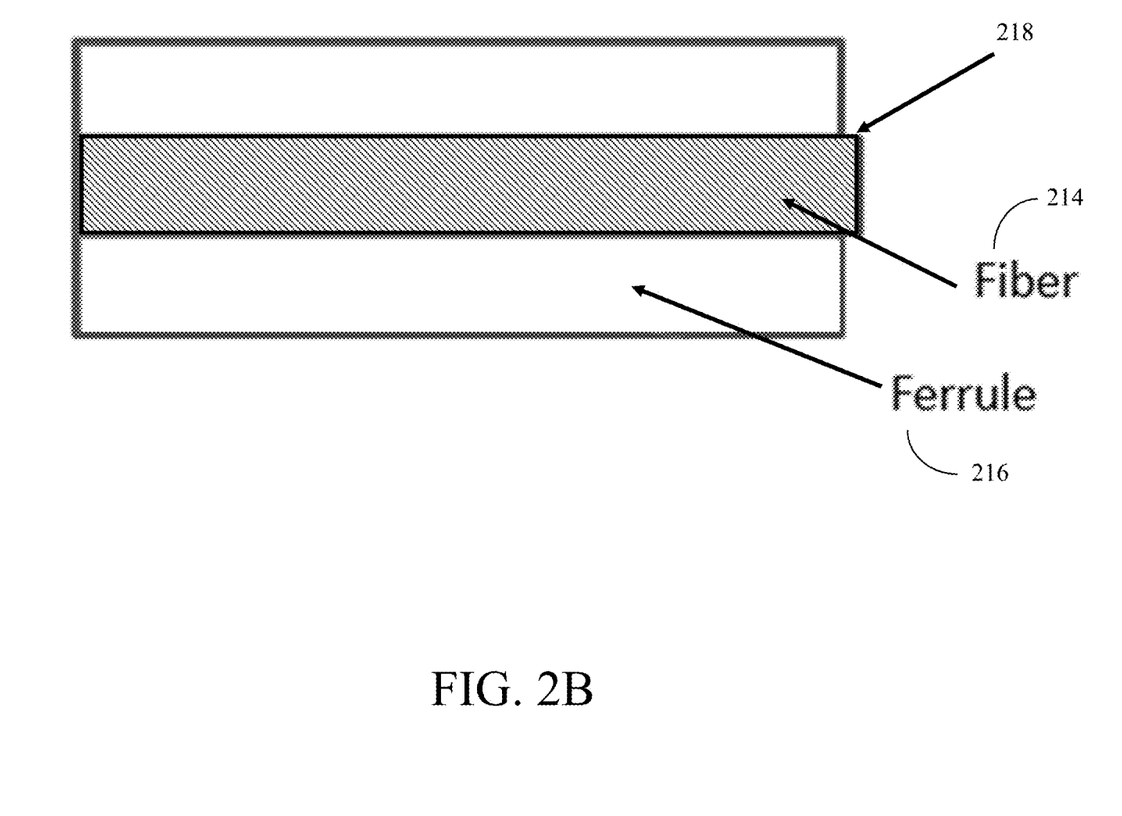
FIG. 2B shows a diagram illustrating a pistoning effect of the fiber beyond the connector that can occur as a result of thermal conductivity mismatch in accordance with an embodiment of the present disclosure.

FIGS. 2A and 2B show diagrams illustrating issues with coupling high power laser systems into epoxy-based fiber connectors for infrared fibers. FIG. 2A shows a diagram illustrating failure points caused by light not coupled to the core of the fiber in accordance with an embodiment of the present disclosure. The fiber of FIG. 2A includes fiber coating 202, fiber cladding 204, and fiber core 206. In FIG. 2A, light 208 is ideally coupled to fiber core 206. Stray light 210 not coupled to fiber core 206 can leak to fiber cladding 204 and can be absorbed 212 by fiber coating 202. FIG. 2B shows a diagram illustrating a pistoning effect of the fiber beyond the connector (i.e., ferrule) that can occur as a result of thermal conductivity mismatch in accordance with an embodiment of the present disclosure. FIG. 2B includes fiber 214 and a ferrule 216 (e.g., as shown in FIGS. 1A and 1B). In an embodiment, fiber 214 includes fiber core 206, fiber cladding 204, and (optionally) fiber coating 202. In an embodiment, thermal conductivity mismatch between fiber 214 and ferrule 216 leads to a pistoning effect 218 of fiber 214 beyond ferrule 216 and stress failure (e.g., radial expansion) of fiber 214.

4. Exemplary Methods for Mechanically Encapsulating an Infrared Fiber into a Fiber Connector Embodiments of the present disclosure provide systems and methods for encapsulating an infrared fiber into a fiber connector that mitigate failure mechanisms in high power laser systems (e.g., as described above). For example, embodiments of the present disclosure provide systems and methods for mechanically encapsulating an infrared transmitting optical fiber, removing any power coupled to the cladding of the infrared optical fiber, and bridging the thermal properties between the optical fiber and the mechanical ferrule used.

For example, embodiments of the present disclosure include an exemplary reflow method, an exemplary extrusion method, and an exemplary polish-free method for encapsulating an infrared fiber into a fiber connector. In an embodiment, a fiber optic cable includes an infrared optical fiber (e.g., a step index fiber), such as a fluoride-based fiber, tellurite-based fiber, germinate-based fiber, chalcogenide-based fiber, and/or a chalcogenide-based glass tube, and the fiber can be connectorized on both ends (i.e., it can have a ferrule attached to both ends) with an infrared epoxyless connector.

In an embodiment, the fiber core diameter is between 1 and 600 µm, and the clad diameter is between 50 µm and 1 mm. In an embodiment, the IR transmitting material of the tube has a refractive index that is higher than the refractive index of the cladding of the optical fiber, and the IR transmitting material acts as a cladding stripper. In an embodiment, the fiber is protected along its length with mechanical shielding, such as a polymer tube or metallic armored cable.

Embodiments of the present disclosure advantageously use IR transparent materials for tubes encapsulating fibers, which have a very high viscosity, unlike conventional epoxy-based materials. For example, conventional epoxy-based methods utilize a process whereby the epoxy is injected into the ferrule. Epoxy can be injected but is not IR-transparent, leading to the failure mechanisms described above with reference to FIGS. 2A and 2B. Embodiments of the present disclosure use IR-transparent glass, which alleviates these failure states. In an embodiment, the IR-transparent glass material(s) used are not injected. Thus, embodiments of the present disclosure provide methods, described below with reference to FIGS. 3-5, for encapsulating an IR fiber within an IR tube to make an epoxyless IR connector.

In an embodiment, the exemplary reflow method, the exemplary extrusion method, and the exemplary polish-free method do not require the fusing of particles with in the ferrule for the process to succeed. In an embodiment, the use of material(s) with a glass transition temperature allows for the material(s) to flow through openings. For example, glasses can be softened to very low viscosities (similar to water, $10^{-3}$ poise), and so they can flow together without fusing as a crystalline powder would when heated beyond the melting point.

Figure 3:
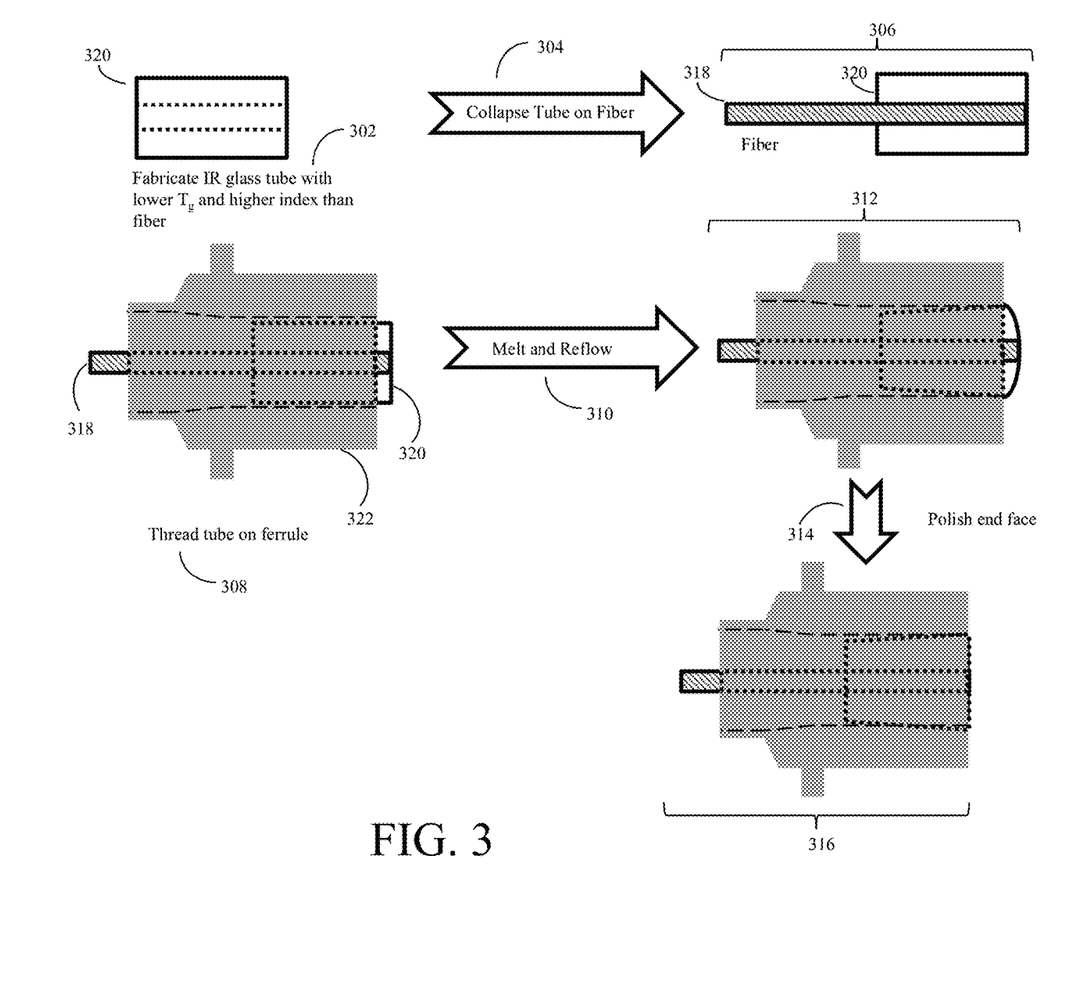
FIG. 3 is a diagram illustrating exemplary steps for encapsulating an infrared fiber into a fiber connector according to a reflow method of an embodiment of the present disclosure.

4.1 Exemplary Reflow Method for Encapsulating an Infrared Fiber into a Fiber Connector FIG. 3 is a diagram illustrating exemplary steps for encapsulating (e.g., mechanically encapsulating) an infrared fiber into a fiber connector according to a reflow method of an embodiment of the present disclosure. In step 302, an IR transparent glass tube 320 (e.g., either cast or extruded) is fabricated with lower softening temperature ($T_g$) than a fiber 318 (e.g., an IR transmitting fiber) and a higher refractive index than the fiber 318 (e.g., a difference of refractive index between tube 320 and fiber cladding of fiber 318 of at least 0.0005). In an embodiment, IR transparent glass tube 320 has an absorption in the infrared wavelength less than 10 dB/cm (e.g., 2 dB/m). In an embodiment, tube 320 is hollow (e.g., as shown via dotted lines with reference to step 302). Further, in an embodiment of step 302, fiber 318 is inserted into tube 320.

In an embodiment, the IR transmitting material of tube 320 has a glass transition temperature higher than 100° C. In an embodiment, the IR transmitting material of tube 320 has a glass transition temperature that is at least 10° C. lower than the glass transition temperature of the IR fiber and is lower than the softening temperature of ferrule 322. In an embodiment, the IR transmitting material of tube 320 has a coefficient of thermal expansion that can be as low as one fifth the coefficient of thermal expansion of the fiber 318. In an embodiment, the IR transmitting material of tube 320 has a coefficient of thermal expansion that is between 0.2 and 3 times the coefficient of thermal expansion of fiber 318. In an embodiment, tube 320 has an inner diameter opening that is larger than the outer diameter of fiber 318, and tube 320 has an outer diameter that is smaller than the outer diameter of the tip of ferrule 322.

In step 304, the tube 320 can either be threaded (e.g., tube 320 can hold the fiber via a static connection) or collapsed (e.g., tube 320 can be heated, shrinking tube 320 and causing tube 320 to come into contact with fiber 318 and to seal fiber 318 inside tube 320) on fiber 318, resulting in device 306 (e.g., a tube-covered fiber) with a tip of fiber 318 extending beyond tube 320. In step 308, both parts (i.e., tube 320 and fiber 318) are threaded into ferrule 322 (e.g., a mechanical ferrule) such that a tip of fiber 318 and the tube 320 protrude beyond the end of ferrule 322. In step 310, the infrared glass of tube 320 is softened (e.g., via melting), reflowing into the air gaps and bonding to fiber 318 and ferrule 322, resulting in device 312.

In an embodiment of steps 304-312, tube 320 and fiber 318 are inserted into ferrule 322 and heated for a temperature high enough to soften tube 320 but not fiber 318 or ferrule 322, and the parts are kept at this temperature until tube 320 reflows and fills the gaps between tube 320 and fiber 318 and between tube 320 and ferrule 322.

In an embodiment of steps 304-312, tube 320 and fiber 318 are first heated to a temperature high enough to soften tube 320 but not fiber 318, and tube 320 is collapsed onto fiber 320 to ensure an optical and thermal contact between tube 320 and fiber 318. Then, in an embodiment, the combined tube 320 and fiber 318 device 306 is threaded through ferrule 322 and heated to a temperature high enough to flow tube 320 but not fiber 318 or ferrule 322. In an embodiment, the parts are kept at this high temperature until tube 320 flows to seal the opening between device 306 and the opening of ferrule 322.

In an embodiment of steps 304-312, tube 320 and fiber 318 are heated to a temperature high enough to soften tube 320 but not fiber 318, and tube 320 is collapsed onto fiber 318 to ensure an optical and thermal contact between tube 320 and fiber 318. In an embodiment, the combined device 306 is partially extruded through ferrule 322 having an inner diameter opening smaller than the outer diameter of collapsed tube 320 at a temperature high enough to flow tube 320 but not fiber 318 or ferrule 322. In an embodiment, part of device 306 remains inside ferrule 322, while the remaining parts protrude beyond the tip of the connector.

In an embodiment, the IR glass transmits IR light and has a refractive index to strip cladding guided light. In (optional) step 314, the structure (at least tip 318 and tube 320, but possibly also including ferrule 322) is then polished (e.g., to ensure an optically transmissive surface) to expose the end face of the fiber, thereby polishing away the portion of tube 320 protruding beyond the end of the end of ferrule 322, resulting in device 316. In an embodiment, fiber 318 and tube 320 are polished to reach an optically smooth surface but remain protruding beyond ferrule 322 such that the endface surface of fiber 318 is patterned to reduce reflection.

In an embodiment, the tube material and dimensions serve multiple functions. For example, in an embodiment, the material of tube 320 has a higher refractive index than the cladding of infrared fiber 318. Because of the higher refractive index of tube 320, tube 320 can capture any light straying from the core. This higher refractive index impacts the signal at the other end of fiber 318 by cleaning the output optical field of any non-core guided light. In an embodiment, the surface area of tube 320 is larger than the fiber cladding surface area (for the fiber section inside the tube), so any optical power initially carried inside the cladding is spread over a wider area when captured by tube 320. The length and outer diameter of tube 320 can act as engineering controls to spread the power, passively managing any heat generated by light being absorbed at the tube-ferrule interface.

The outer diameter of tube 320 can also be used as an engineering control for optical system design, as it can increase the tolerance to misalignment of the incident light with respect to the fiber. A typical multimode infrared fiber could have a core dimension of 100 μm and cladding dimension of 170 μm. If an outer tube having a 1 mm outer diameter is used, it can provides over 5 times the linear translation tolerance for the focusing of a free-space laser into the system without catastrophic failure associated with irradiating the ferrule.

Figure 4:
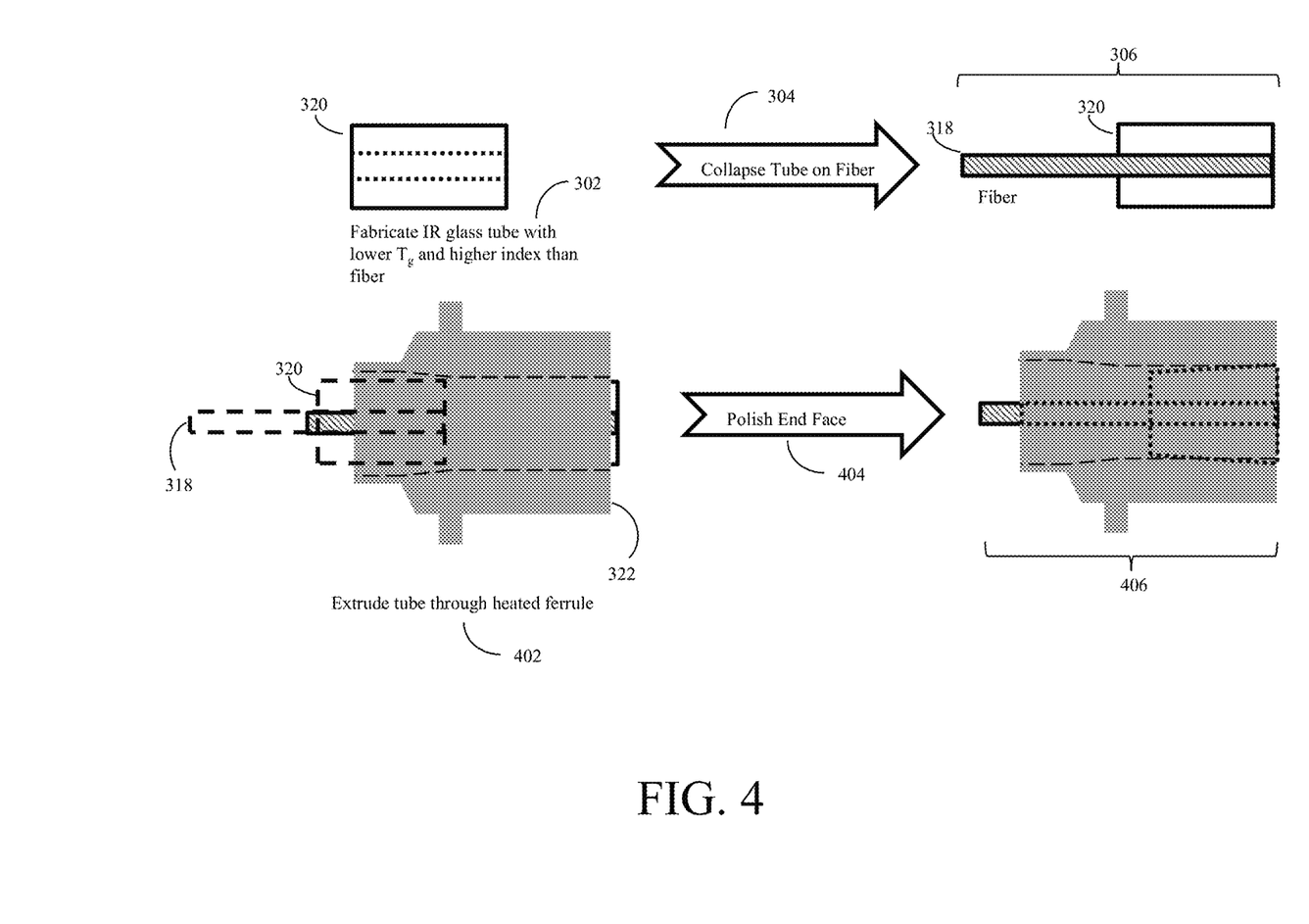
FIG. 4 is a diagram illustrating exemplary steps for encapsulating an infrared fiber into a fiber connector according to an extrusion method of an embodiment of the present disclosure.

4.2 Exemplary Extrusion Method for Encapsulating an Infrared Fiber into a Fiber Connector FIG. 4 is a diagram illustrating exemplary steps for encapsulating an infrared fiber into a fiber connector according to an extrusion method of an embodiment of the present disclosure. In step 302, an IR transparent glass tube 320 is fabricated with lower softening temperature ($T_g$) than a fiber 318 and a higher refractive index than the fiber 318. In an embodiment, tube 320 is hollow (e.g., as shown via dotted lines with reference to step 302). Further, in an embodiment, in step 302, the fiber 318 is inserted into the tube 320, and then the tube 320 is heated and stretched to seal the infrared fiber 318 inside. In step 304, the tube 320 is collapsed on the fiber 318, resulting in device 306 with fiber tip 318 extending beyond tube 320.

In step 402, the combined fiber 318 and tube 320 piece is extruded (e.g., as shown via the dotted lines for fiber 318 and tube 320) through ferrule 322. For example, in an embodiment, fiber 318 and tube 320 are pushed, from left to right, through ferrule 322 until fiber 318 and tube 320 extrude through the end aperture of ferrule 322. In an embodiment, ferrule 322 is heated to a temperature above the softening point of tube 320 but below the softening point of fiber 318. In an embodiment, fiber 318 is heated beyond its glass transition temperature within ferrule 322, and fiber 318 is threaded through ferrule 322 (or, in an embodiment, flowed into ferrule 322 to mechanically lock fiber 322 inside ferrule 322) with at least part of fiber 318 protruding beyond the endface of ferrule 322. In (optional) step 404, the extruded solid rod comprising fiber 318 and tube 320 is polished down to the surface of ferrule 322 to expose the end face of the fiber 318, resulting in device 406.

Figure 5:
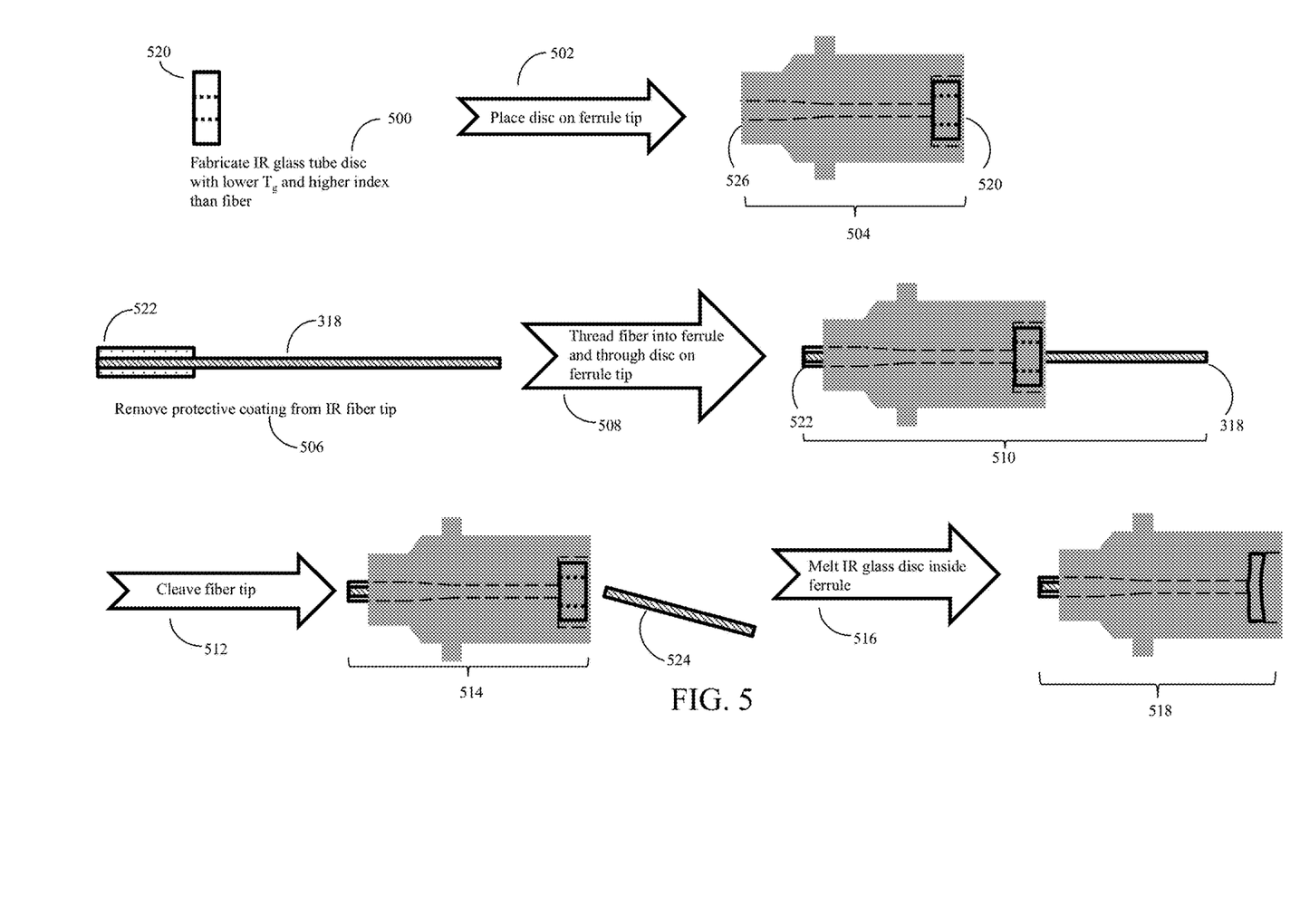
FIG. 5 is a diagram illustrating exemplary steps for encapsulating an infrared fiber into a fiber connector according to a polish-free method of an embodiment of the present disclosure.

4.3 Exemplary Polish-Free Method for Encapsulating an Infrared Fiber into a Fiber Connector FIG. 5 is a diagram illustrating exemplary steps for encapsulating an infrared fiber into a fiber connector according to a polish-free method of an embodiment of the present disclosure. In step 500, an IR transparent glass tube disc 520 is fabricated with lower softening temperature ($T_g$) than a fiber 318 and a higher refractive index than the fiber 318. In an embodiment, disc 520 is hollow (e.g., as shown via dotted lines with reference to step 500).

In FIG. 5, ferrule 526 has a recess at an edge of ferrule 526 configured to hold disc 520. In step 502, disc 520 is placed in the recess of ferrule 526, resulting in device 504. In an embodiment, fiber 318 has protective coating 522. In step 506, a portion of protective coating 522 is removed from fiber 318, leaving a portion of fiber 318 without protective coating 522.

In step 508, fiber 318 is threaded into ferrule 526 and through device 504 and through disc 520 that was placed in the recess of ferrule 526, resulting in device 510. In step 512, the portion 524 of fiber 318 that protrudes past the edge of device 510 is cleaved off, resulting in device 514. In step 516, the IR glass disc 520 inside device 514 is melted, resulting in device 518.

In an embodiment, in the above method, fiber 318 is mechanically encapsulated within ferrule 526, and fiber 318 has sufficient contact with disc 520 to strip light from cladding modes, thereby alleviating the failure state illustrated by FIG. 2A. Further, because the glass of disc 520 adheres to both ferrule 526 and fiber 318, fiber 318 cannot radially expand or piston forward, thereby alleviating the failure state illustrated by FIG. 2B. Additionally, in an embodiment, there is no need for a polishing step using the process of FIG. 5, resulting in less contamination on the endface of fiber 318 within ferrule 526.

5. Exemplary Device

Embodiments of the present disclosure include fiber optic cables (e.g., connectors) with an IR fiber protected along its length by an appropriate mechanical barrier such as polymer tubing or armored cable. In an embodiment, the fiber optic ends of the cable are terminated using, for example, the methods of FIG. 3 and/or FIG. 4. Fiber optic cables in accordance with embodiments of the present disclosure can include an epoxyless connector architecture that can thermally manage the fiber to ferrule thermal mismatch and passively manage heat generated at the fiber tip.

Figure 6:
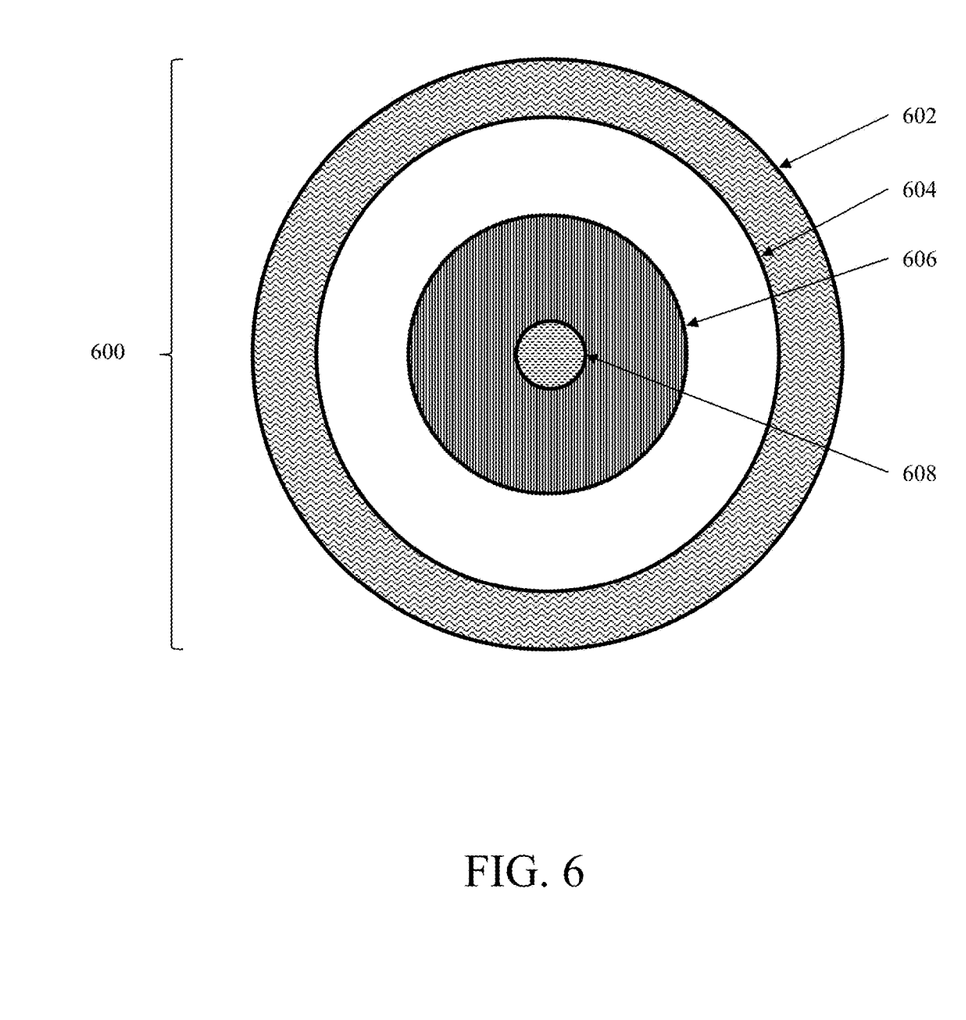
FIG. 6 is a diagram of a cross section of an end face of an exemplary connector 600 (e.g., an epoxyless connector) in accordance with an embodiment of the present disclosure.

FIG. 6 is a diagram of a cross section of an end face of an exemplary connector 600 (e.g., an epoxyless connector) in accordance with an embodiment of the present disclosure that can be made, for example, using the methods of FIG. 3, FIG. 4, FIG. 5, and/or additional methods in accordance with embodiments of the present disclosure. The connector 600 of FIG. 6 includes a ferrule 602, a tube 604, a fiber 606 (e.g., a fiber cladding), and a fiber core 608. In an embodiment, tube 604 is made of a glass, which has a higher softening point temperature than epoxy and is also IR transparent. Because the glass is IR transparent, it does not absorb light that reaches it, alleviating the failure state illustrated by FIG. 2A. Further, because the glass of tube 604 adheres to both ferrule 602 and fiber 606, fiber 606 cannot radially expand or piston forward, thereby alleviating the failure state illustrated by FIG. 2B.

In an embodiment, any excess light that is coupled to fiber 606 can be extracted into tube 604 by selecting glass for tube 604 with a refractive index that is higher than the refractive index of fiber 606. In conventional fiber connectors, light is absorbed by the epoxy and/or coating (e.g., as illustrated by FIG. 2A). In an embodiment of the present disclosure, because of the IR transparency (e.g., less than 10 dB/cm) and higher refractive index (e.g. a difference of refractive index between tube 604 and fiber 606 of at least 0.0005) of tube 604, light can propagate within tube 604 without being absorbed by other elements of the connector (e.g., by ferrule 602 and/or by tube 604).

In conventional fiber connectors, unwanted power is absorbed over the surface area of fiber 606. In an embodiment of the present disclosure, light can propagate through tube 604 and spread into a larger surface area inside ferrule 602, thereby reducing the intensity (e.g., power per unit area) of light (e.g., because the same power is spread over a larger area. Because the light is less intense than light in a conventional connector, ferrule 602 can remove heat generated by the light more easily. For example, for a 200 µm diameter fiber 606 and a 400 µm outer diameter tube 604, the total surface area of the inner interface of ferrule 602 is increased by a factor of at least 2 with respect to the total surface area of a conventional fiber connector with a 200 µm diameter fiber 606.

6. Exemplary Embodiments

Figure 7A:
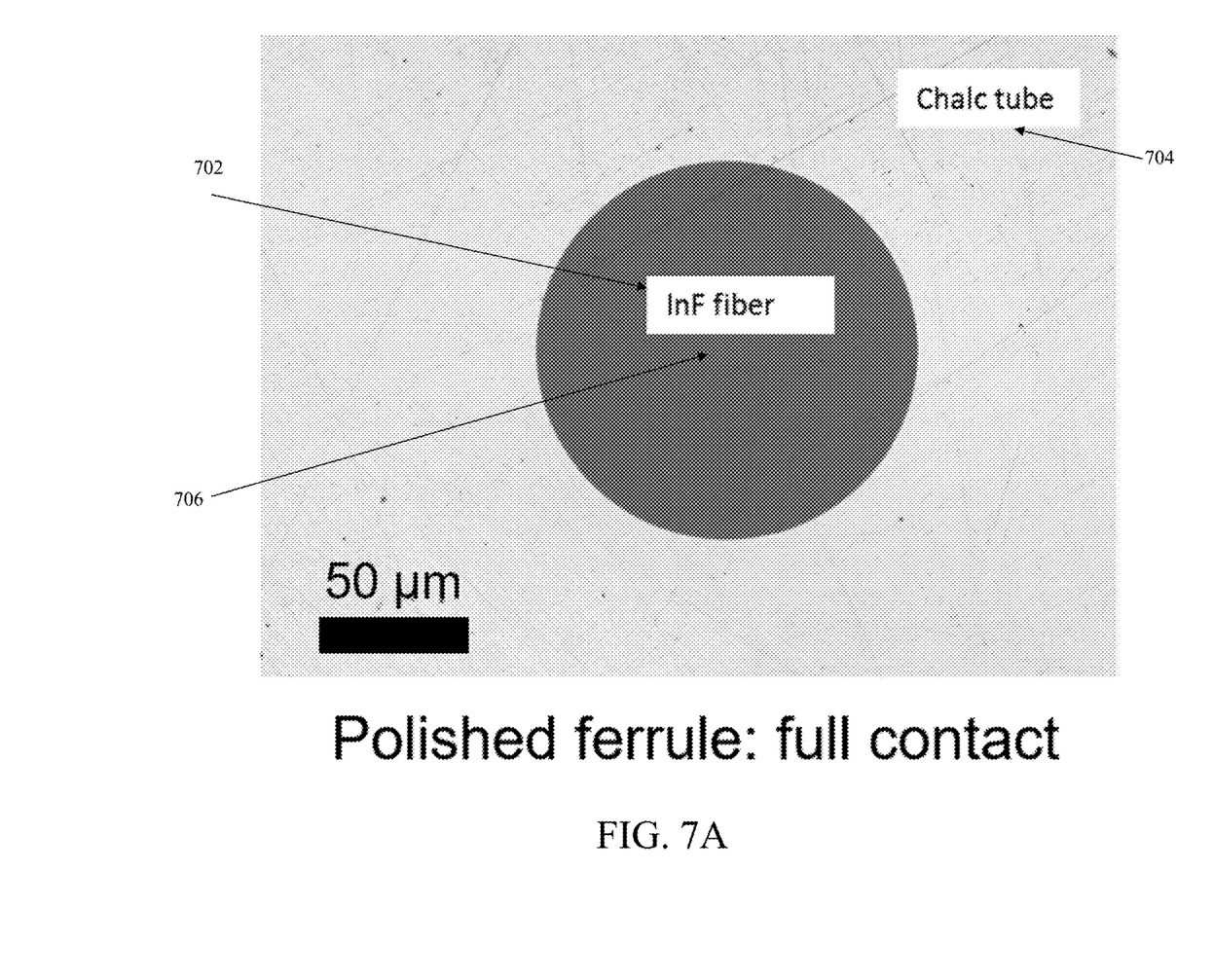
FIG. 7A shows an image of an end top surface of a ferrule after polishing showing the interface between an IR fiber and tube in accordance with an embodiment of the present disclosure.
Figure 7B:
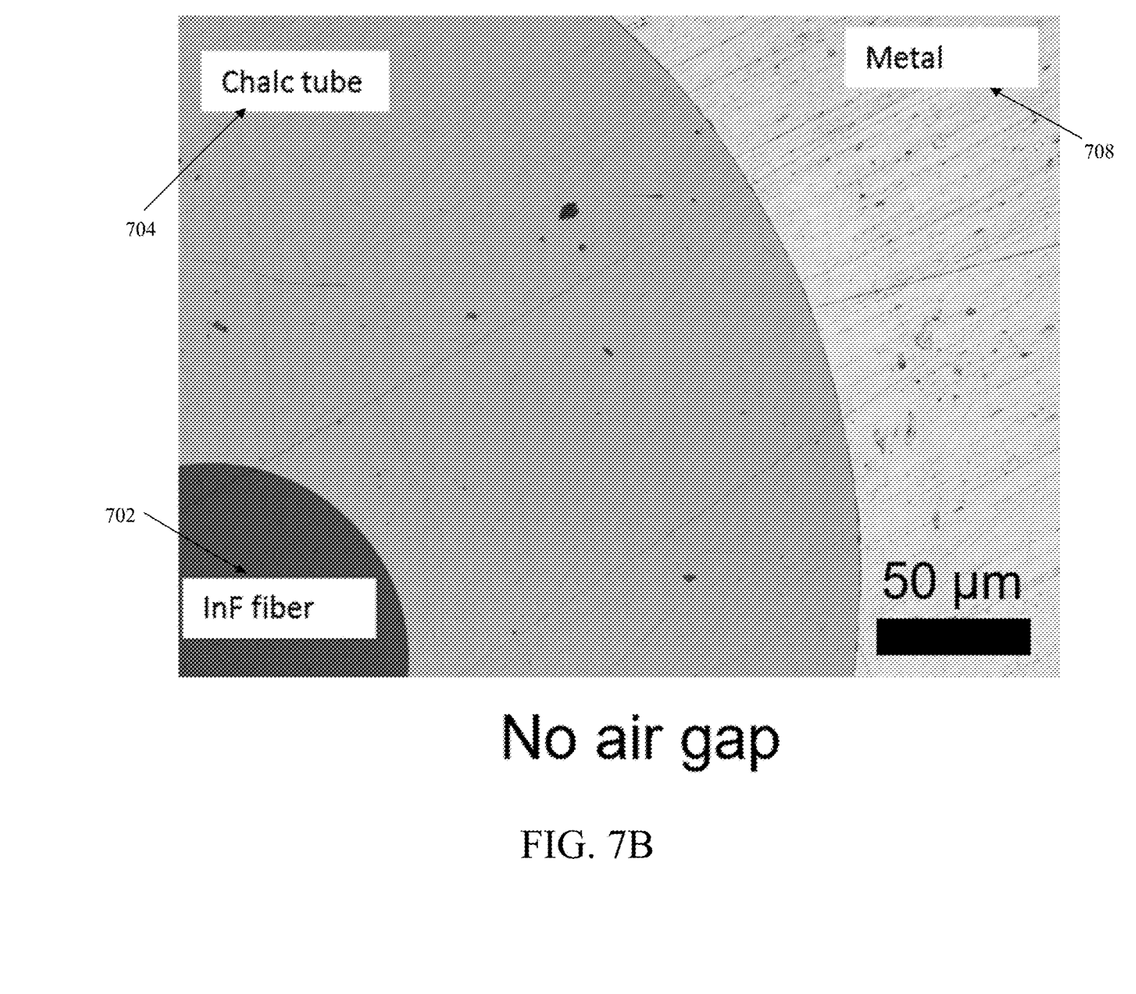
FIG. 7B shows an interface between a fiber tube and ferrule after polishing in accordance with an embodiment of the present disclosure.

FIGS. 7A and 7B show images illustrating an exemplary result of encapsulation of an infrared fiber in a ferrule to make an epoxyless infrared fiber connector in accordance with an embodiment of the present disclosure. FIG. 7A shows an image of an end surface of a ferrule after polishing (e.g., the end surface of device 316 after step 314 of FIG. 3) showing the interface between an IR fiber and tube in accordance with an embodiment of the present disclosure. FIG. 7B shows an interface between a fiber tube and ferrule after polishing (e.g., the end surface of device 316 after step 314 of FIG. 3) in accordance with an embodiment of the present disclosure.

In FIGS. 7A and 7B, an indium fluoride (InF) fiber 702 with core diameter 9 µm and cladding diameter 125 µm is encapsulated in an arsenic selenide (a type of chalcogenide) glass tube 704 with initial dimensions having a 200 µm inner diameter opening and a 400 µm outer diameter. A fiber core 706 is located in the middle of fiber 702. FIG. 7B shows metal 708 of the ferrule. In this example, it was is reflowed to seal a stainless steel ferrule with a 430 µm diameter opening. In FIGS. 7A and 7B, the tube 704 composition is $As_{30}Se_{70}$. The fiber 702 was threaded into the tube 704, and the tube 704 and fiber 702 were threaded through the ferrule. Approximately 1 mm tip protruded from the ferrule end. A spot infrared heater was used to increase the temperature of the tip beyond the glass softening temperature of the tube, reaching ~260° C. The tube 704 reflowed around the fiber 702 and into the connector, mechanically sealing the fiber 702 in place.

The refractive index of the tube 704 is on the order of 2.7, while the refractive index of the fluoride fiber 702 used is 1.5. The glass softening temperature for the infrared fiber 702 is ~320° C., and the melting point for the ferrule is ~1400° C. Therefore, the processing temperature of the tube 704 is well below both the fiber 702 and the ferrule. The high refractive index of the tube 704 acts as a cladding mode stripper, removing any light that is not coupled into the core and propagates along the cladding.

Figure 8:
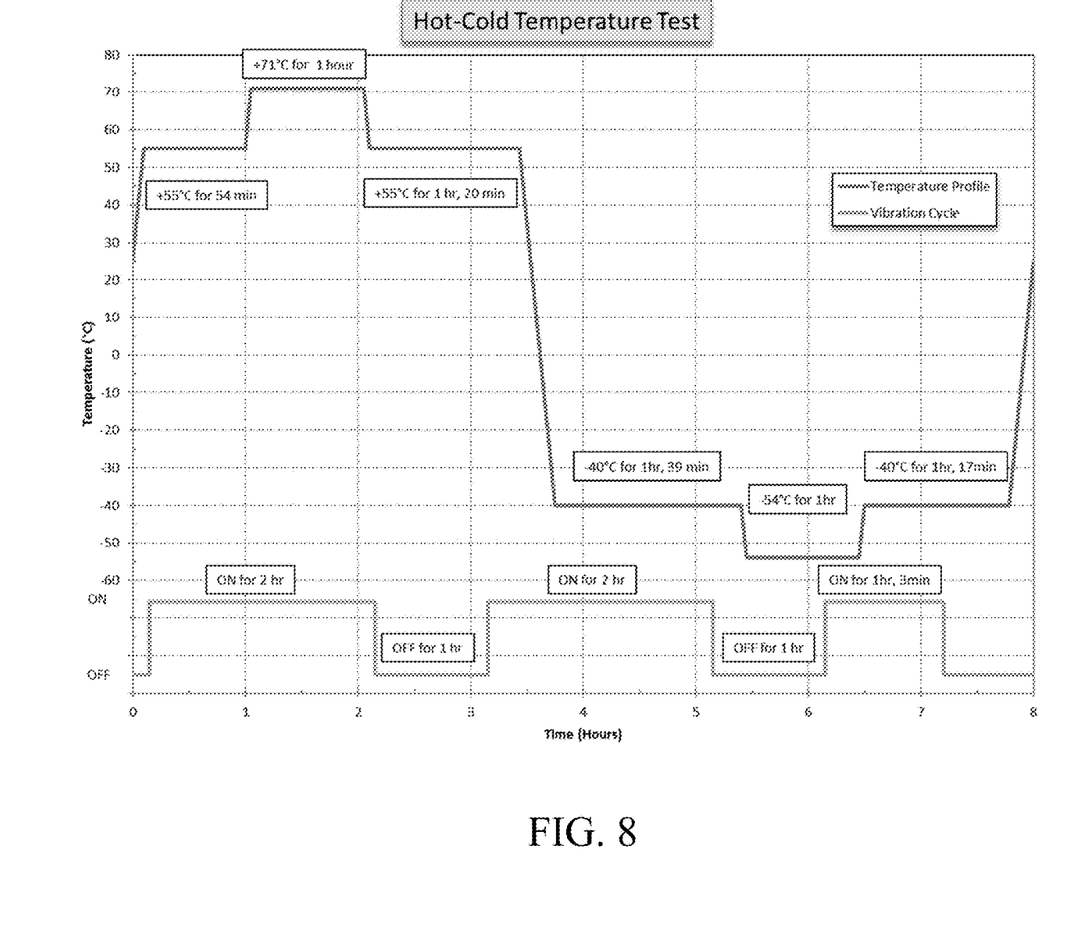
FIG. 8 is a diagram showing exemplary test results in accordance with an embodiment of the present disclosure.

In an embodiment, three different cables were thermally cycled with a 100% success rate (i.e., no cable failures), and the cables were monitored with a 1.95 µm laser. FIG. 8 is a diagram showing exemplary test results in accordance with an embodiment of the present disclosure.

7. Exemplary Advantages

Embodiments of the present disclosure (e.g., including an IR transmitting epoxyless fiber optic connector) have several advantages over conventional techniques. For example, in an embodiment, the tube can act as a cladding mode stripper, and the tube can act as a mechanical seal to the fiber inside the ferrule. Further, in an embodiment, the tube is infrared transparent and does not absorb infrared light that is not incident in the infrared fiber. In an embodiment, the thermal expansion coefficient of the tube is similar to the fiber and ferrule, reducing the stress and distortions associated with increases of the temperature at the tip of the ferrule. Further, in an embodiment, a material with glass transition temperature can flow to fill openings, the viscosity can be controlled by the temperature, and there is no fusion of independent particles.

Embodiments of the present disclosure can have high power handling. For example, embodiments of the present disclosure can have the same mechanical encapsulation as conventional epoxy and can use glass that is transparent over infrared laser operational band(s). Embodiments of the present disclosure can use glass that can be made large enough to spread the heat generated by any uncoupled light and can isolate light from reaching fiber polymer coating.

Embodiments of the present disclosure can provide cladding stripping. For example, embodiments of the present disclosure can increase tolerance to thermal and vibration disturbances to laser systems, can provide increased reliability by allowing less skilled users to perform operations with fiber optic cables, and can remove unwanted power being carried along the cladding of the fiber.

Embodiments of the present disclosure can provide thermal matching. For example, embodiments of the present disclosure can avoid the fiber optic pistoning effect of conventional systems. In an embodiment, the glass coefficient of thermal expansion (CTE) can be independently tailored to compensate for fiber expansion. For example, in an embodiment, glass can be tailored to bridge the CTE between the ferrule and fiber, alleviating stress in the fiber.

8. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A method, comprising:
    fabricating an infrared (IR) transparent tube with a lower softening temperature ($T_g$) than a fiber and a second refractive index that is higher than a first refractive index of the fiber;
    inserting the fiber into the tube;
    threading or collapsing the tube onto the fiber, resulting in a tube-covered fiber;
    threading the tube-covered fiber into a ferrule such that a tip of the tube-covered fiber protrudes beyond the end of the ferrule;
    heating the tube, thereby enabling IR glass of the tube to flow into gaps between the tube and the ferrule and/or between the fiber and the tube; and
    polishing the tip of the tube-covered fiber protruding beyond the end of the ferrule.

2. The method of claim 1, wherein collapsing the tube onto the fiber comprises:
    heating the tube, causing the tube to shrink, come into contact with the fiber, and seal the tube with the fiber.

3. The method of claim 1, wherein heating the tube comprises:
    heating the tube and the fiber to a temperature high enough to soften the tube but not the fiber or the ferrule.

4. The method of claim 1, wherein threading or collapsing the tube onto the fiber further comprises:
    after inserting the fiber into the tube but before threading the tube-covered fiber into the ferrule, heating the tube and the fiber to a temperature high enough to soften the tube but not fiber.

5. The method of claim 1, wherein polishing the tip of the tube-covered fiber protruding beyond the end of the ferrule comprises:
polishing the tip of the tube-covered fiber protruding beyond the end of the ferrule such that, after polishing, a portion of the tip of the tube-covered fiber remains protruding beyond the end of the ferrule but that an endface surface of the fiber is patterned to reduce reflection.

6. The method of claim 1, wherein polishing the tip of the tube-covered fiber protruding beyond the end of the ferrule comprises:
polishing away the tip of the tube-covered fiber protruding beyond the end of the ferrule.

7. The method of claim 1, wherein fabricating the tube further comprises:
fabricating the tube such that an absorption in the IR wavelength of the tube is less than 10 dBm/cm.

8. The method of claim 1, wherein fabricating the tube further comprises:
fabricating the tube such that a difference between the first refractive index and the second refractive index is at least 0.0005.

9. The method of claim 1, wherein fabricating the tube further comprises:
fabricating the tube such that the IR transparent tube is configured to propagate light and to spread the light over a surface area of the tube, thereby reducing an intensity of the light.

10. The method of claim 1, wherein fabricating the tube further comprises:
fabricating the tube such that IR transmitting material of the tube has a glass transition temperature higher than 100° C.

11. The method of claim 1, wherein fabricating the tube further comprises:
fabricating the tube such that IR transmitting material of the tube has a first glass transition temperature that is at least 10° C. lower than a second glass transition temperature of fiber cladding of the fiber, and wherein the first glass transition temperature is lower than a softening temperature of the ferrule.

12. A method, comprising:
fabricating an infrared (IR) transparent disc with a lower softening temperature ($T_g$) than a fiber and a second refractive index that is higher than a first refractive index of the fiber;
placing the disc within a recess of a ferrule;
stripping protective coating from a portion of an IR transparent fiber;
inserting the fiber into the disc within the ferrule;
cleaving a tip of the fiber; and
melting the disc within the ferrule.

13. The method of claim 12, wherein fabricating the disc further comprises:
fabricating the disc such that the disc is hollow.

14. The method of claim 12, wherein melting the disc within the ferrule further comprises:
melting the disc within the ferrule resulting in a combined device wherein the fiber has sufficient contact with the disc to strip light from cladding modes.

15. The method of claim 12, wherein melting the disc within the ferrule further comprises:
melting the disc within the ferrule resulting in a combined device wherein the fiber cannot radially expand or piston forward within the ferrule.

16. A method, comprising:
fabricating an infrared (IR) transparent tube with a lower softening temperature ($T_g$) than a fiber and second refractive index that is higher than a first refractive index of the fiber;
inserting the fiber into the tube;
threading or collapsing the tube onto the fiber, resulting in a tube-covered fiber;
extruding the tube-covered fiber through a ferrule such that a tip of the tube-covered fiber protrudes beyond the end of the ferrule; and
heating the ferrule.

17. The method of claim 16, wherein heating the ferrule further comprises:
heating the ferrule to a temperature above a first softening point of the tube but below a second softening point of the fiber.

18. The method of claim 16, wherein heating the ferrule further comprises:
heating the ferrule such that the fiber is heated beyond a glass transition temperature of the fiber.

19. The method of claim 16, wherein heating the ferrule further comprises:
heating the ferrule, thereby enabling IR glass of the tube to flow into gaps between the tube and the ferrule and/or between the fiber and the tube.

20. The method of claim 16, further comprising:
polishing the tip of the tube-covered fiber protruding beyond the end of the ferrule.

* * * * *

UNITED STATES PATENT AND TRADEMARK OFFICE
CERTIFICATE OF CORRECTION

PATENT NO. : 10,359,574 B2
APPLICATION NO. : 16/000579
DATED : July 23, 2019
INVENTOR(S) : Rafael R. Gattass et al.

Page 1 of 1

It is certified that error appears in the above-identified patent and that said Letters Patent is hereby corrected as shown below:

On the Title Page

Item (72) should read as follows:
Inventors: Rafael R. Gattass, Washington DC (US);
      Leslie Brandon Shaw, Woodbridge, VA (US);
      Jasbinder S. Sanghera, Ashburn, VA (US);
      Shyam S. Bayya, Ashburn, VA (US);
      Daniel L. Rhonehouse, Chesapeake Beach, MD (US);
      Vinh Q. Nguyen, Fairfax, VA (US);

Signed and Sealed this
Third Day of March, 2020

Andrei Iancu
*Director of the United States Patent and Trademark Office*